Aug. 25, 1964   B. R. BENITH   3,145,745
BLADE GUIDE HOLDER FOR BAND SLICER FOR BREAD
Filed Oct. 1, 1962   2 Sheets-Sheet 1
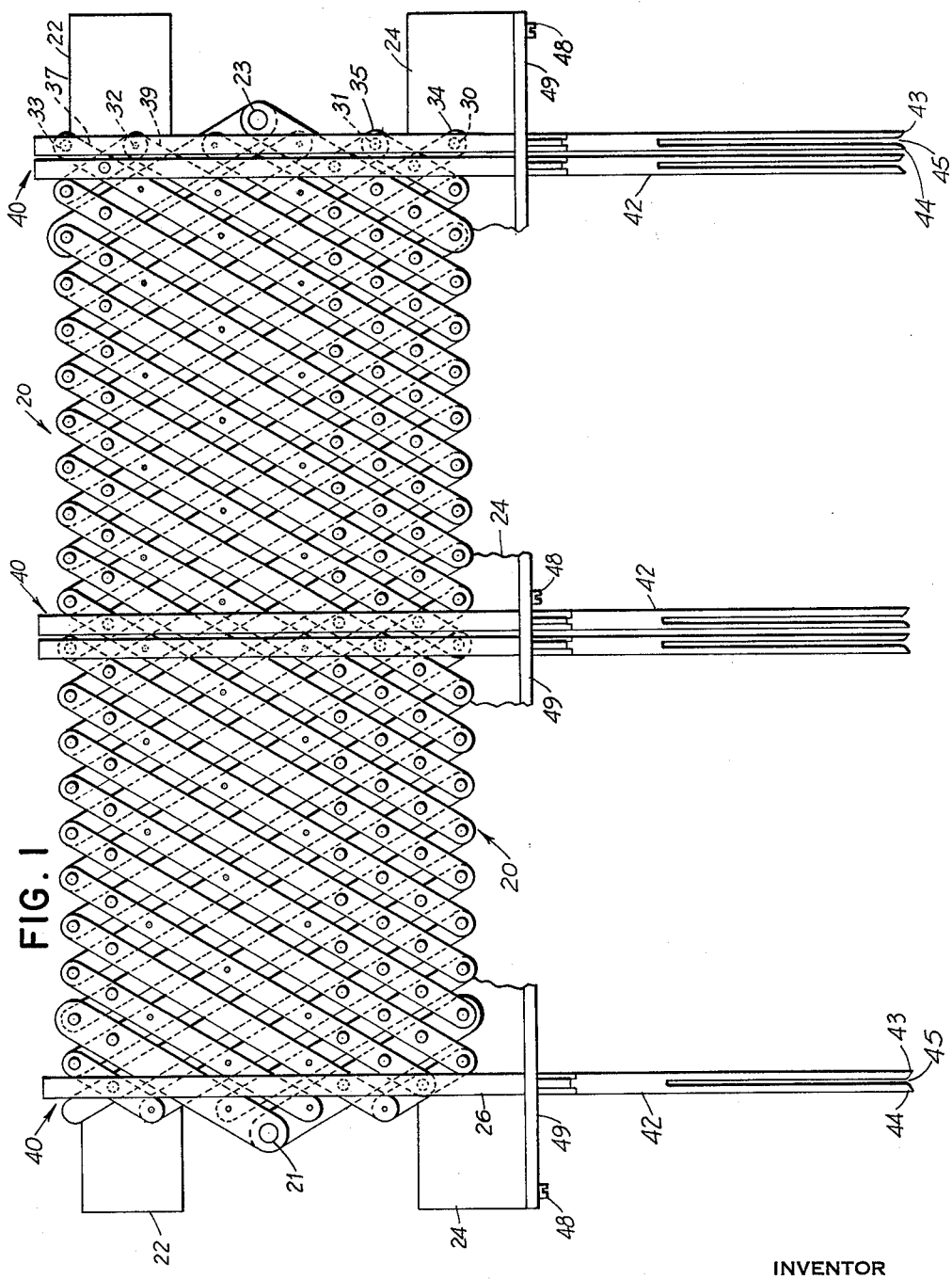
INVENTOR
BENEDICT R. BENITH
BY
ATTORNEY

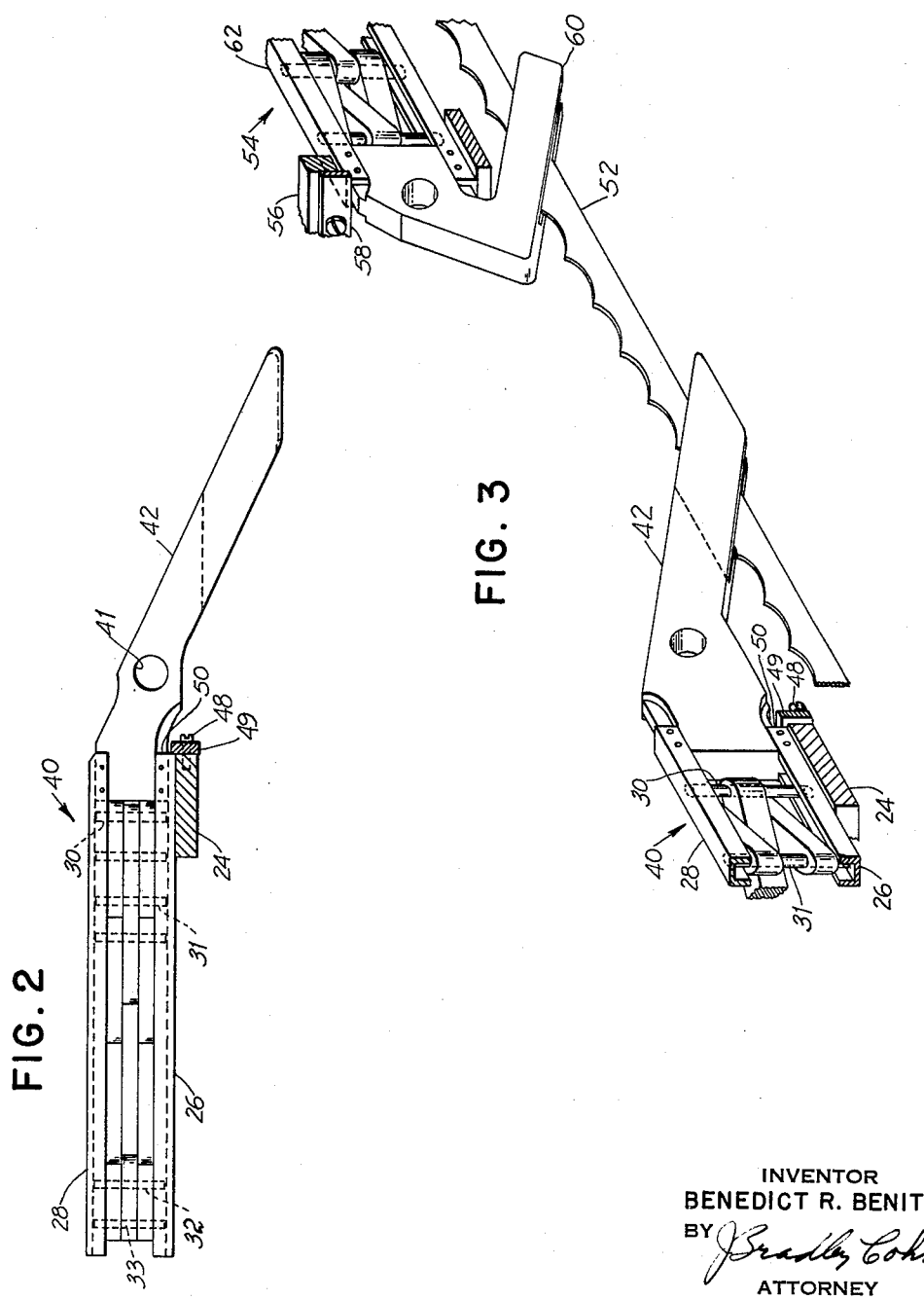

United States Patent Office 3,145,745
Patented Aug. 25, 1964

3,145,745
BLADE GUIDE HOLDER FOR BAND SLICER
FOR BREAD
Benedict R. Benith, Westbury, N.Y., assignor to American Machine & Foundry Company, a corporation of New Jersey
Filed Oct. 1, 1962, Ser. No. 227,156
4 Claims. (Cl. 146—88)

This invention is an improvement in a high speed bread slicing machine which employs multiple bandsaw type blades to perform the slicing operation.

An object of the invention is the improvement of bread slicing machines.

A more particular object of the invention is an improvement in the mechanism which guides the bandsaw type blades in the bread slicing region.

While the invention is intended primarily for application in high speed bread slicing machines, employing guides for multiple bandsaw type blades, it is considered that it may well be adaptable to other machines employing multiple guides for blades or for other like devices, particularly in cases where these elements require replacement from time to time for any reason, such as, for instance, for maintenance or for replacement due to breakage or for other reasons.

A bread slicing machine which employs multiple bandsaw type blades and guides therefor for use with which the structure of the present invention is primarily designed, is described for instance in Patent No. 2,293,083, issued August 18, 1942, to P. G. Schlemmer, Patent No. 2,375,231, issued May 8, 1945, to A. A. Kottman, as well as in my patent applications, Serial No. 34,561, filed June 7, 1960, and Serial No. 227,158, filed on even date herewith. As is well understood by those skilled in the art, the high speed bread slicing machines, such as those described therein, are arranged so that their blade guides are mounted in the machines in such manner that if one of them breaks, or is required to be replaced for any reason, it is not possible to remove the blade guides individually. It is generally necessary to remove many of the blade guides to give access to the blade guide involved. This is expensive. Further it is hazardous because of the keenness of the blades which are honed to razor sharpness. In the present invention, the blade guides are designed to be individually demountable. This obviously effects a saving when it is necessary to replace an individual guide and it greatly lessens the hazards involved in the maintenance of the machines.

A pair of blade guides is required to guide the cutting element which makes each slice in a loaf. The blade guides in a bread slicing machine must be adjustable to cut slices of different thicknesses. The maximum thickness of the guides is limited by the greatest thinness of the desired slices. The blades are guided through bifurcations or tines at the extremities of each of the individual blade guides. Since the guide must accommodate the blade, the thickness of each tine is something less than one-half the thickness of the thinnest slice required. The blades are directed through the slot between the tines at very high speed and the guide is subjected to considerable stress and wear. Breakage of the tines and replacement because of excessive wear are not infrequent. The present invention greatly minimizes the difficulty of replacement.

A feature of the present invention is a readily demountable holder for a blade guide.

Many other objects, advantages and features of this invention reside in the construction, combination and arrangement of parts involved in the embodiment of the invention as will be understood from the following description of the accompanying drawings wherein:

FIG. 1 is a plan view of an assembly showing an adjustable mounting for the blade guides with five blade guide assemblies only mounted thereon;

FIG. 2 is a side view of a blade guide assembly; and

FIG. 3 is a perspective showing two blade guide assemblies coacting in guiding a blade.

Refer now to FIG. 1 which shows an adjustable rack, or lattice, generally designated by the numeral 20. Rack 20 is of the type generally termed a "Lazy Susan." It may be expanded by applying tension, and contracted by applying pressure, between studs 21 and 23 by adjustable screw means, not shown. It has the characteristic that, as it is expanded or contracted, studs such as 30, 31, 32 and 33 secured in the lattice bars, such as 34, 35, 39 and 37, respectively, remain in alignment as shown in FIG. 1. Other studs in these and other bars also remain in alignment. The studs project both above and below the bars in which they are secured and serve as guide pins and mounting pins for blade guide mounting assemblies, such as assembly 40.

Reference to FIG. 2 shows an individual blade guide assembly 40 in elevation. It comprises the blade guide 42 which terminates at its lower end, as shown in FIG. 1 in two tines 43 and 44 between which is the blade guide way 45. The aperture 41 is provided only to facilitate machining. The blade guide at its upper portion may be welded, or riveted, to two bars 26 and 28, each having U-shaped sections, as shown best in FIG. 3. The bars are disposed so that they slide over the pins, that is to say, the side walls of the lower U-shaped bar 26 are upright and those of the upper U-shaped bar 28 are inverted, or directed downwardly, so that the bars form opposed channels which can slide over the studs.

It will be observed that the rectangular opening defined at its bottom and top by bars 26 and 28, respectively, and at its right-hand end by the left-hand end of blade guide 42, has no closure at its left-hand end. In this respect it differs from those presently known in the art. This difference permits it to be pushed into position with the top and bottom channels 26 and 28 fitted snugly about its set of aligned pins.

The lattice 20 and the blade guide assemblies are supported in the machine by plates 22 and 24 which are secured to the machine frame. All of the blade guide assemblies when in position are locked by a common bar 49, which is fastened, by means of screws such as 48, to plate 24, and abuts the right-hand end 50 of each of the lower U-channels 26. Any blade guide assembly unit may be withdrawn, singly, by removing screws 48 and locking bar 49 without the necessity for disturbing any other unit.

FIG. 3 shows in perspective two blade guide assemblies 40 and 54 coacting in guiding a bandsaw blade 52, only a portion of which blade is shown. As mentioned heretofore, two blade guides are required to guide each blade run in making a slice. These are disposed in the machine immediately above and below the slicing zone through which the bread is pushed. An individual lattice, such as 20, is required to mount each set of blade guides. The complete upper and lower blade guide lattices with their respective blade guide assemblies are substantially the same except that, due to spatial conditions, the lower portion 60 of the blade guide in the upper assembly is directed back toward its respective U-channels while those in the lower assembly are directed forwardly. Further the locking assembly comprising the bar 56 and locking plate 58, demountably fastened to bar 56, superpose the blade guides such as 54 and plate 58 engages the forward end of the upper U-channel 62.

What is claimed is:

1. In combination in a bread slicing machine, a "Lazy Susan" type lattice and a blade guide assembly, said lattice having two individual sets of aligned opposed pins for each said assembly, one of said sets projecting from the front and the other from the rear of said lattice, each said assembly having an individual mounting frame for mounting the assembly on the lattice, said frame comprising a pair of channel members, each of said members having a U-shaped cross section, said U-shaped sections having their open ends opposed one to another, each of said channels arranged to slide over an individual set of said pins, for ready individual mounting on and demounting from said lattice to facilitate maintenance.

2. A bread slicing machine having, in combination, two opposed aligned individual sets of coacting mounting pins, a blade guide holder assembly comprising a blade guide and a mounting therefor, said mounting having opposed channel bars, each of said channel bars having a U-shaped cross section, said bars having their longitudinal axes lying substantially in the same plane and spaced in parallel relationship one from another therein, each of said bars having the open ends of its U-shaped cross section opposed to the open ends of the U-shaped cross section of the other bar, to form opposed longitudinal slots, each of said sets of pins is embraceable by an individual one of said slots for readily sliding over said opposed sets of pins in mounting and demounting said assembly.

3. A bread slicing machine having, in combination, a "Lazy Susan" type lattice, comprising a plurality of sets of opposed aligned mounting elements, each of said sets adapted for mounting an individual blade guide assembly, a plurality of blade guide assemblies, each of said assemblies having means coacting with said mounting elements to permit individual mounting and demounting thereon without involving any other of said assemblies, said means comprising opposed longitudinal slots in each assembly slidably embracing an individual opposed set of said elements.

4. In a bread slicing machine, in combination, a plurality of bandsaw type slicing blades, an individual blade guide assembly for each of said blades, an individual mounting for each said assembly, said assembly comprising a first fork portion having two tines defining a blade guide way therebetween, said first fork portion secured to a second mounting portion, said second mounting portion adapted for individual sliding engagement with its said individual mounting, said individual mounting comprising a Lazy Susan type lattice having a plurality of opposed sets of aligned pins projecting from its opposed sides, said mounting portion comprising two elements defining two opposed slots, said slots disposed to embrace therebetween an individual set of said opposed pins and an individual locking bar for locking all of said blade guide assemblies in position after all have been slid into position on said Lazy Susan type lattice.

References Cited in the file of this patent
UNITED STATES PATENTS

| | | |
|---|---|---|
| 640,902 | Henson | Jan. 9, 1900 |
| 2,254,524 | Hartman | Sept. 2, 1941 |
| 2,434,884 | Kottmann et al. | Jan. 20, 1948 |
| 2,755,856 | Clemens | July 24, 1956 |